(12) United States Patent
Sakamoto

(10) Patent No.: US 6,225,773 B1
(45) Date of Patent: May 1, 2001

(54) STEPPING MOTOR AND HAVING EXTERNAL ROTOR AND ELECTROMAGNETIC-COMBINED-PERMANENT MAGNET STATOR

(75) Inventor: Masafumi Sakamoto, Kiryu (JP)

(73) Assignee: Japan Servo Company Ltd., Gunma (JP)

( * ) Notice: Subject to any disclaimer, the term of this patent is extended or adjusted under 35 U.S.C. 154(b) by 0 days.

(21) Appl. No.: 09/422,515

(22) Filed: Oct. 21, 1999

Related U.S. Application Data

(62) Division of application No. 09/002,398, filed on Jan. 2, 1998, now Pat. No. 6,051,898.

(51) Int. Cl.[7] .................................................. H02P 8/00
(52) U.S. Cl. ......................... 318/685; 318/696; 318/686
(58) Field of Search .................................. 318/560–696, 318/811, 803, 82, 94, 64, 800; 363/43, 37, 40, 65, 132; 310/185, 186, 67 R, 49

(56) References Cited

U.S. PATENT DOCUMENTS

| | | | |
|---|---|---|---|
| 4,532,458 | * | 7/1985 | Kuznetsov et al. .................. 318/111 |
| 4,634,952 | * | 1/1987 | Yoshino et al. ...................... 318/811 |
| 4,849,870 | * | 7/1989 | Heinrich ................................ 363/37 |
| 5,059,883 | * | 10/1991 | Takahashi ............................ 318/696 |
| 5,216,343 | * | 6/1993 | Genheimer et al. ............. 318/568.18 |
| 5,389,749 | * | 2/1995 | Hokari et al. ........................ 187/293 |
| 5,414,339 | * | 5/1995 | Masaki et al. ........................ 318/800 |
| 5,442,250 | * | 8/1995 | Stridsberg ............................ 310/186 |
| 5,460,244 | * | 10/1995 | Tanahashi ............................ 187/293 |
| 5,644,483 | * | 7/1997 | Peng et al. ............................. 363/37 |
| 5,657,217 | * | 8/1997 | Watanabe et al. ..................... 363/71 |
| 5,731,970 | * | 3/1998 | Mori et al. ........................... 363/132 |
| 5,801,936 | * | 9/1998 | Mori et al. ........................... 363/132 |
| 5,933,339 | * | 8/1999 | Duba et al. ............................ 363/71 |

* cited by examiner

*Primary Examiner*—Paul Ip
(74) *Attorney, Agent, or Firm*—Nilles & Nilles SC

(57) ABSTRACT

A rotor composite type three-phase stepping motor having a stator consisting of two stator elements each having 6 n pieces of stator magnetic pole with Ns pieces of pole tooth formed on the tip end of each stator magnetic pole piece, and a permanent magnet held by the two stator elements therebetween, a rotor of magnetic material arranged so as to face to a periphery of the stator through an air gap, Nr pieces of pole tooth being formed on a periphery of the rotor, and exciting windings wound around each stator magnetic pole piece of the stator elements consisting of two sets of three-phase windings each wound around 3n pieces of stator magnetic pole among the 6 n pieces of stator magnetic pole. A mechanical angle formed between the adjacent magnetic pole pieces in the 3n pieces of magnetic pole with each set of three-phase windings is 60° m/n and a mechanical degree angle formed between the 3n pieces of magnetic pole with each set of three-phase windings is (60° m/n–θs), where Nr is a number of rotor pole teeth, each of n, m and Ns is an integer not less than 1, and θs is a step angle of (30°–Nr) k where k is an integer number not less than 1.

9 Claims, 15 Drawing Sheets

PRIOR ART FIG.1
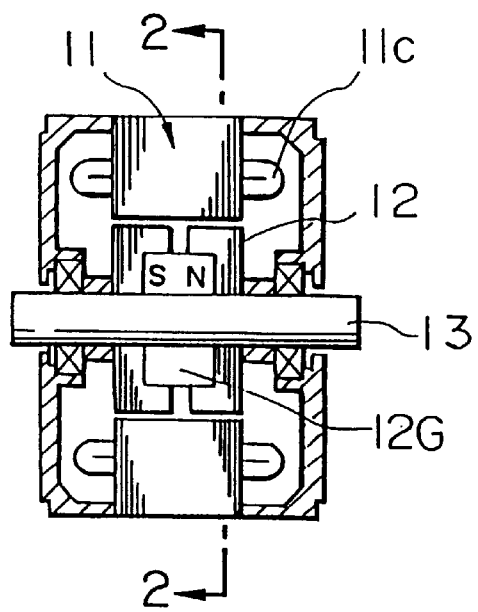
PRIOR ART FIG.2
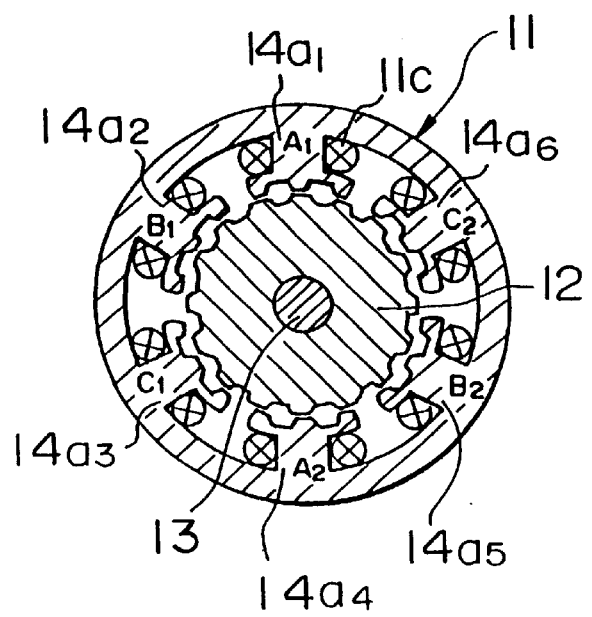

PRIOR ART FIG.3
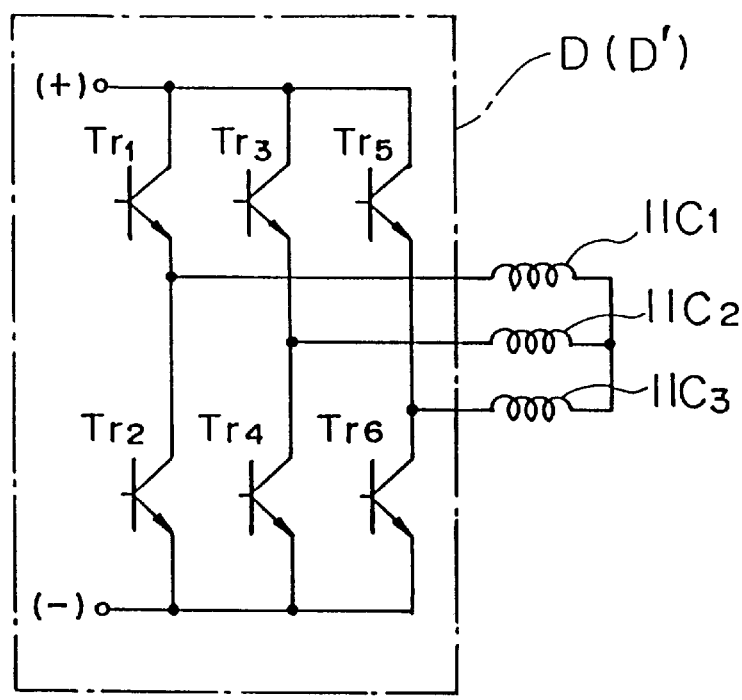
FIG.4A
PRIOR ART
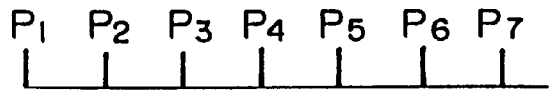
FIG.4B
PRIOR ART
FIG.4C
PRIOR ART
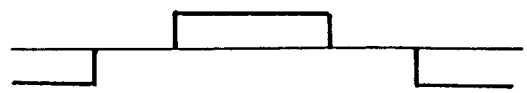
FIG.4D
PRIOR ART
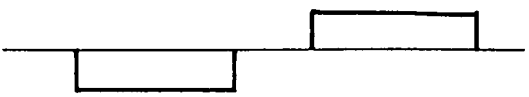

STEPPING MOTOR AND HAVING EXTERNAL ROTOR AND ELECTROMAGNETIC-COMBINED-PERMANENT MAGNET STATOR

CROSS REFERENCE TO A RELATED APPLICATION

This application is a divisional of U.S. patent application Ser. No. 09/002,398, filed Jan. 2, 1998 now U.S. Pat. No. 6,051,898.

BACKGROUND OF THE INVENTION

1. Field of the Invention

This invention relates to a stepping motor and a driving method thereof and, more particularly, relates to a composite type three-phase stepping motor having no reduction gear box for rotating directly a transfer drum of a reproducing machine or the like.

2. Description of the Prior Art

A transfer drum of a reproducing machine or the like is driven by a brushless motor. The rotary speed of the motor is reduced by using a reduction gear box from 1500 rpm to 30 or 60 rpm, for example.

FIG. 1 shows a vertically sectional front view of a conventional inner rotor thee-phase hybrid type stepping motor for driving the transfer drum or the like. FIG. 2 shows a cross section taken along lines 2—2 of FIG. 1.

In FIGS. 1 and 2, reference numeral 11 denotes a stator, 11c a stator winding, 12 a rotor, 12G a permanent magnet, 13 a rotor shaft, and $14a_1 \sim 14a_6$ stator magnetic poles. Symboles $A_1$ and $A_2$ denote one pair of stator magnetic poles for an A phase, $B_1$ and $B_2$ denote another pair of magnetic poles for a B phase, and $C_1$ and $C_2$ denote the other pair of magnetic poles for a C phase.

FIG. 3 shows a driving circuit D or D' for the three-phase hybrid type stepping motor, wherein the winding $11C_1$ of A phase, a winding $11C_2$ of B phase, and a winding $11C_3$ of C phase are connected to(+)and (−) terminals of an electric power source (not shown) through six transistors $Tr_1 \sim Tr_6$.

To each of the transistors $Tr_1 \sim Tr_6$, a base current of a predetermined value is supplied from the electric power source.

One of the transistors $Tr_1$, $Tr_3$, $Tr_5$ at the upper side of said six transistors and one of the transistors $Tr_2$, $Tr_4$, $Tr_6$ at the lower side of the six transistors, for example, are switched ON to supply currents to two-phase windings in the three-phase windings, respectively.

Specifically, if the transistors $Tr_1$ and $Tr_4$ are switched ON, the winding $11C_1$ of A phase becomes (+) potential and the winding $11C_2$ of B phase becomes (−) potential, and the entire sequence of energization of windings can be shown in FIGS. 4A to 4D.

FIGS. 4A to 4D show time charts indicating the operation of the driving circuit shown in FIG. 3. FIG. 4A show trigger pulses to be supplied to the transistors $Tr_1 \sim Tr_6$, respectively. FIGS. 4B, 4C and 4D show currents to be supplied to the windings $11C_1$ of A phase, $11C_2$ of B phase and $11C_3$ of C phase, respectively.

The above-mentioned conventional stepping motor has many problems and defects.

① In the inner rotor three-phase hybrid type stepping motor as shown in FIGS. 1 and 2, if the outer diameter of the motor is about 60 mm, the resolution is less than 600 (step angle is 0.6°).

In order to obtain a resolution of more than 600, the number of the rotor pole tooth (Nr)must be increased to more than 100, so that the width of the pole tooth becomes smaller than the thickness of the magnetic iron plate forming the rotor core.

This means that the rotor cannot be formed by pressing.

When the transfer drum of the reproducing machine etc. is driven by such stepping motor having the resolution of less than 600, the fluctuation in rotation becomes large, so that the stepping motor must be rotated at a high speed and the speed must be reduced.

Further, due to the backlash etc. of the reduction member, it is difficult to enhance the color image quality of the copy formed by the reproducing machine and to prevent the color doubling from being occurred.

In order to solve such problems, it has hitherto been proposed a direct drive system wherein the rotation of the motor is directly transmitted to the transfer drum without reducing the speed.

Such direct drive system has been disclosed in the Japanese Patent Laid-Open NOS.208668/1990 and 235573/1992.

The Japanese Patent Laid-Open NO.208668/1990 discloses a method of rotating in a predetermined direction.an electrophotographic photosensitive drum (transfer drum) by using a flat motor as a prime mover, the rotary speed of the electrophotographic photosensitive drum being controlled by a servo mechanism.

The Japanese Patent Laid-Open NO.235573/1992 discloses a driving method of a transfer drum of a LBP wherein a brushless motor having an encoder is used as a prime mover, and the rotary speed of the brushless motor is controlled by an output of the encoder.

Another method of controlling the rotary speed of a stepping motor by an output signal of an encoder mounted on the stepping motor has been proposed.

However, either method must be carried out by using means for controlling the rotary speed of the motor, which is complicated in construction and high in cost.

On the other hand, a direct drive system simple in construction wherein a transfer drum is driven directly by a stepping motor having no encoder has been proposed.

In this system,no controlling means is required, however, the step angle of such stepping motor is 0.6°.

It is necessary to limit the fluctuation of the rotary speed of the transfer drum for a plain paper copier(PPC) or (LBP) to less than 0.2% (peak to peak) when the transfer drum is rotated at 60 rpm in order to maintain a good image quality.

SUMMARY OF THE INVENTION

An object of the present invention is to solve the above problems and to provide a composite type three-phase stepping motor and a driving method thereof functioned as a sensorless actuator, of which rotary fluctuation is small even at the low speed.

Another object of the present invention is to provide an outer rotor composite type three-phase stepping motor comprising a stator consisting of two stator elements each having 6n pieces of stator magnetic pole extending outwardly radially with Ns pieces of pole tooth formed on the tip end of each stator magnetic pole, and a permanent magnet held by the two stator elements therebetween, a rotor of magnetic material arranged so as to face to an outer periphery of the stator through an air gap, Nr pieces of pole tooth being formed on an inner periphery of the rotor, and exciting windings wound around each stator magnetic pole of the stator elements consisting of two sets of three-phase windings each wound around 3 n pieces of stator magnetic pole among the 6 n pieces of stator magnetic pole, an angle formed between the adjacent magnetic poles in the 3 n pieces of magnetic pole with each set of three-phase windings being 60 m/n and an angle formed between the two sets of three-phase windings being (60° m/n−θs), where Nr is a number of rotor pole teeth, each of n, m and Ns is an integer not less than 1, and θs is a step angle and 30°/Nr or a multiple integer of 30°/Nr.

In case that twelve stator magnetic poles are used, one set of three-phase windings is wound around every other stator magnetic poles among the twelve stator magnetic poles, and the other set of three-phase windings is wound around remaining stator magnetic poles among the twelve stator magnetic poles, and an angle formed between the adjacent magnetic poles in the twelve magnetic poles is changed between (30°−θs) and (30°+θs) alternately.

In a driving method of the composite type three-phase stepping motor, two driving circuits each having six transistors connected to form a bridge are used and triggered alternately for driving the composite type three-phase stepping motor.

In another driving method of the composite type three-phase stepping motor having k sets of three-phase windings arranged in the circumferential direction of the stepping motor, k sets of a driving circuit each having six transistors connected to form a bridge are used and triggered in order, a first set of three-phase circuit being triggered again in (k+1)th order, where k is an integer and $\geq 3$.

Further object of the present invention is to provide a rotor type stepping motor comprising annular stator having 6 m pieces of stator main magnetic pole extending radially with Ns pieces of pole tooth formed on the tip end of each stator main magnetic pole, and windings wound around the stator main magnetic poles, and a hybrid type rotor consisting of two magnetic rotor elements arranged so as to face to a periphery of the stator through an air gap, Nr pieces of pole tooth being formed on a periphery of each of the rotor elements, and a permanent magnet held by the two magnetic rotor elements therebetween, each pole tooth on one of the rotor elements being deviated by one half of pitch of the pole teeth from each pole tooth on the other rotor elements, the 6 m pieces of stator main magnetic pole being arranged so that an angle formed between each of the adjacent stator main magnetic poles is changed and repeated m times in the order of (1) 60°/m,
(2) 60°/m,
(3) (60°/m)−α°,
(4) 60°/m,
(5) 60°/m,
(6) (60°/m)+α°, where m is an integer and $\geq 1$, and α is a deflection angle (mechanical angle).

In the other case, a stator similar in construction to the above is used, and as a rotor, a cylindrical permanent magnet with N and N poles formed alternately on an outer periphery thereof is used, instead of the hybrid type rotor.

In each of the above cases, it is preferable that the deflection angle α is 30/Nr, 75/Nr, or 90/Nr, where Nr is the number of pole teeth of each rotor magnetic pole, or the number of pair of N and S poles of the cylindrical magnet.

In the driving method of the permanent magnet type stepping motor, phase windings wound around adjacent three stator main magnetic poles are connected to form a star connection or a delta connection, and excited in order by voltages, a phase of the voltage applied on the winding wound around (n)th main magnetic pole being deviated by 30° from a phase of the voltage applied on the winding wound around (n+3)th main magnetic pole among the 6 m pieces of the main magnetic poles.

In a case that 12 m pieces of main magnetic pole are used, a phase difference between voltages applied on the windings wound around (n)th and (n+6)th main magnetic poles is set to 30°.

Further, it is possible to drive the permanent magnet type stepping motor as a three-phase stepping motor by setting a phase difference between the voltage applied on the winding wound around (n)th main magnetic pole and the voltage applied on the winding wound around (n+3)th main magnetic pole among the 6 m pieces of the main magnetic poles, or between the voltage applied on the winding wound around (n)th main magnetic pole and the voltage applied on the winding wound around (n+6)th main magnetic pole among the 6 m pieces of the main magnetic poles to zero.

The permanent magnet type stepping motor of the present invention is suitable to use as a winding type double three-phase (six phases) stepping motor, and the reactance component can be reduced to one half of that in the conventional three-phase motor of the same step angle, so that a stepping motor of high speed and high torque can be realized.

Specifically, the number of pole teeth Nr of the rotor of the same step angle according to the present invention becomes one half of that of the conventional three-phase motor, because the step angle is 180° (P·Nr), and the number of phase in the stepping motor according to the present invention is 6, whereas the number of phase in the conventional three-phase motor is 3.

Further, the reactance of the six phases (double three-phase) stepping motor according to the present invention becomes one half of that of the conventional three-phase motor, so that a large current can flow at a higher speed and that a higher torque can be obtained, if the speed is the same, because the reactance component which affects on the value of current in the high speed operation is expressed by Nr·ω₀·L, where ω₀ is mechanical angular velocity, and L is an inductance of coil.

Further object of the present invention is to solve the above task by using a stepping motor of which basic step angle is less than 0.3°.

FIG. 5 shows the relation in rotary speed and fluctuation of rotation between a hybrid type three-phase stepping motor of which basic step angle is 0.6°, suitable to drive the reproducing drum and a double three-phase stepping motor of which basic step angle is 0.3°, wherein two sets of three-phase windings are mounted on a stator.

The basic step angle θs of the stepping motor can be expressed by θs=180°/(P·Nr), where P is the number of phases of the stator windings and Nr is the number of pole teeth of the rotor.

The number of pole teeth Nr of the rotor of a first three-phase stepping motor of which basic step angle is 0.6° shown in FIG. 5 is 100. The number of pole teeth Nr of the rotor of a second double three-phase stepping motor of which basic step angle is 0.3°, wherein two sets of three-phase windings are mounted on a stator is 100.

The number of phases P of the stator windings of the first motor is 3, so that $\theta S_1 = 180/(3 \cdot 100) = 0.6°$, whereas the number of phases P of the stator windings of the second motor is 6, so that $\theta S_2 = 180°/(6 \cdot 100) = 0.3°$.

The rotary speed N of the stepping motor can be expressed by N=θs·Pu·(60/360) rpm, where Pu is a driving pulse number per a second.

The speed fluctuation ΔN of the driving system using the stepping motor can be expressed by ΔN=(ΔT/ω)·n·J, where ω is rotary angular velocity (rad/sec), n is a torque ripple number per one rotation, which can be expressed by 360/θs in case of the stepping motor, ΔT is a width of the torque fluctuation which is reduced according to the phase number of the stator windings, and J is a moment of inertia of the load.

In the direct driving system for driving directly the reproducing drum by the stepping motor under the conditions mentioned above, it may be concluded that such a stepping motor that n is large (the step angle is small) and the phase number of the stator windings is large, and thus ΔT becomes small should be selected, when the moment of inertia J of the reproducing drum and the angular velocity ω are given.

FIG. 5 shows a property of the typical first and second motors each connected to the load J and rotated while varying the drive pulse number Pu, the rotary speed N being plotted on the abscissa and the rotary fluctuation ΔN being plotted on the ordinate.

It is apparent from FIG. 5 that in the first motor having the three-phase stator windings, of which basic step angle is 0.6°, the rotary fluctuation of 0.2% can be realized at a rotary speed N more than 195 rpm, and the rotary fluctuation becomes so large that it cannot be measured at a rotary speed of 60 rpm, and that in the second motor having double three-phase windings, of which basic step angle is 0.3°, the rotary fluctuation of 0.2% can be realized at a rotary speed N of 60 rpm.

Yet further object of the present invention is to provide a rotor permanent magnet type stepping motor comprising a stator having twelve stator main magnetic poles extending radially, symmetrical with respect to a point to one another, and stator windings for phases wound around the stator main magnetic poles, the stator windings for each phase being wound around two stator main magnetic poles symmetrical with respect to a point to each other to form the same polarity, a rotor of magnetic material consisting of two rotor elements each having even number of pole teeth, and a permanent magnet held by the two rotor elements therebetween, each pole tooth on one of the rotor elements being deviated by one half of pitch of the pole teeth from each pole tooth on the other rotor elements, wherein an angle formed between the adjacent main magnetic poles in the twelve main magnetic poles is changed between (30°−α°) and (30°+α°) alternately, where α is a deflection angle.

In the other case, a stator similar in construction to the above is used, and as a rotor, a cylindrical permanent magnet with N and N poles formed alternately on an outer periphery thereof is used, instead of the hybrid type rotor.

In each of the above cases, it is preferable that the deflection angle a is 30°/Nr, 75°/Nr, or 90°/Nr, where Nr is the number of pole teeth of each rotor magnetic pole, or the number of pair of poles of the cylindrical magnet.

It is preferable that a plurality of pole teeth are formed on each tip end of the twelve stator main magnetic poles of the stator.

The permanent magnet type stepping motor can be driven in such a manner that first windings wound around the every other main magnetic poles, and second windings wound around the remaining main magnetic poles are connected to one another to form a star connection or a delta connection, and the first and second windings are excited by currents different in phase from each other.

Further, the permanent magnet type stepping motor can be driven as a three-phase stepping motor by exciting stator windings of adjacent two phase by currents similar in phase to each other.

The permanent magnet type stepping motor of the present invention is suitable to use as a winding type six phases stepping motor, and the reactance component can be reduced to one half of that in the conventional three-phase motor of the same step angle, so that a stepping motor of high speed and high torque can be realized.

Specifically, the number of pole teeth Nr of the rotor of the same step angle according to the present invention becomes one half of that of the conventional three-phase motor, because the step angle is 180°/(P·Nr), where P is the number of phase.

Further, the reactance of the six phases stepping motor according to the present invention becomes one half of that of the conventional three-phase motor, so that a large current can be flowed at a higher speed and that a higher torque can be obtained, if the speed is the same, because the reactance component w hich affects on the value of current in the high speed operation is expressed by Nr·ω$_0$·L, where ω$_0$ is mechanical angular velocity, and L is an inductance of coil.

These and other objects and features of the present invention will become apparent from the following description in conjunction with the attached drawings.

BRIEF DESCRIPTION OF THE DRAWINGS

FIG. 1 is a vertically sectional front view of a conventional inner rotor type three-phase stepping motor;

FIG. 2 is a cross section, taken along lines 2—2 of FIG. 1;

FIG. 3 is a circuit diagram for the three-phase stepping motor shown in FIGS. 1 and 2;

FIG. 4A is a time chart of trigger pulses for transistors of a driving circuit;

FIG. 4B is a time chart of a current for a winding of A phase;

FIG. 4C is a time chart of a current for a winding of B phase;

FIG. 4D is a time chart of a current for a winding of C phase;

DESCRIPTION OF THE PREFERRED EMBODIMENTS

A principle of the present invention will now be explained.

It is desirable to use a stepping motor having a very high resolution (smaller step angle) as a direct drive type sensorless actuator in order to reduce the fluctuation of rotation at low speeds.

For example, the above object can be attained if an encoder which can divide one rotation into 4000 is used in the closed loop. However, such encoder becomes high in cost.

Accordingly, it is desirable to provide a stepping motor which can divide one rotation into 4000. The step angle of the stepping motor can be obtained by a formula of 180°/(Nr·P), where Nr is the number of rotor pole teeth and P is the number of phases.

It is also desirable to increase the number of rotor pole teeth (Nr) and the number of phases (P), however, the number of rotor pole teeth (Nr) is limited, if the motor is limited In size. Further, if the number of phases (P) becomes large, the driving circuit becomes high in cost.

In the present invention, a motor of an outer rotor type is adopted in order to increase the number of rotary pole teeth (Nr), and a composite type three-phase stepping motor is adopted in order to increase the number of phases(p).

The stepping motor is driven by a composite type three-phase driving system of low cost.

Embodiments of the present invention will now be explained concretely.

The merits of the composite type three-phase stepping motor of outer rotor type reside in that the number of rotary pole teeth (Nr) can easily be increased more than that in the inner rotor type and thus the step angle θs can be reduced, where the step angle θs is 180°/(P·Nr).

If the outer diameter of the rotor can be increased, θs of 0.3° can be realized without forming a motor of double three-phase type.

Figure 6:
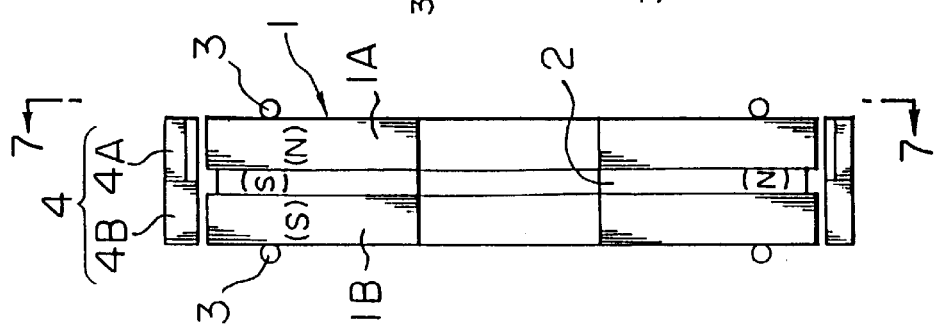
FIG. 6 shows a vertically sectional front view of an outer rotor composite type three-phase stepping motor of a first embodiment of the present invention.

A First Embodiment:

FIG. 6 shows a vertically sectional front view of a composite type three-phase stepping motor of the first embodiment of the present invention.

Figure 5:
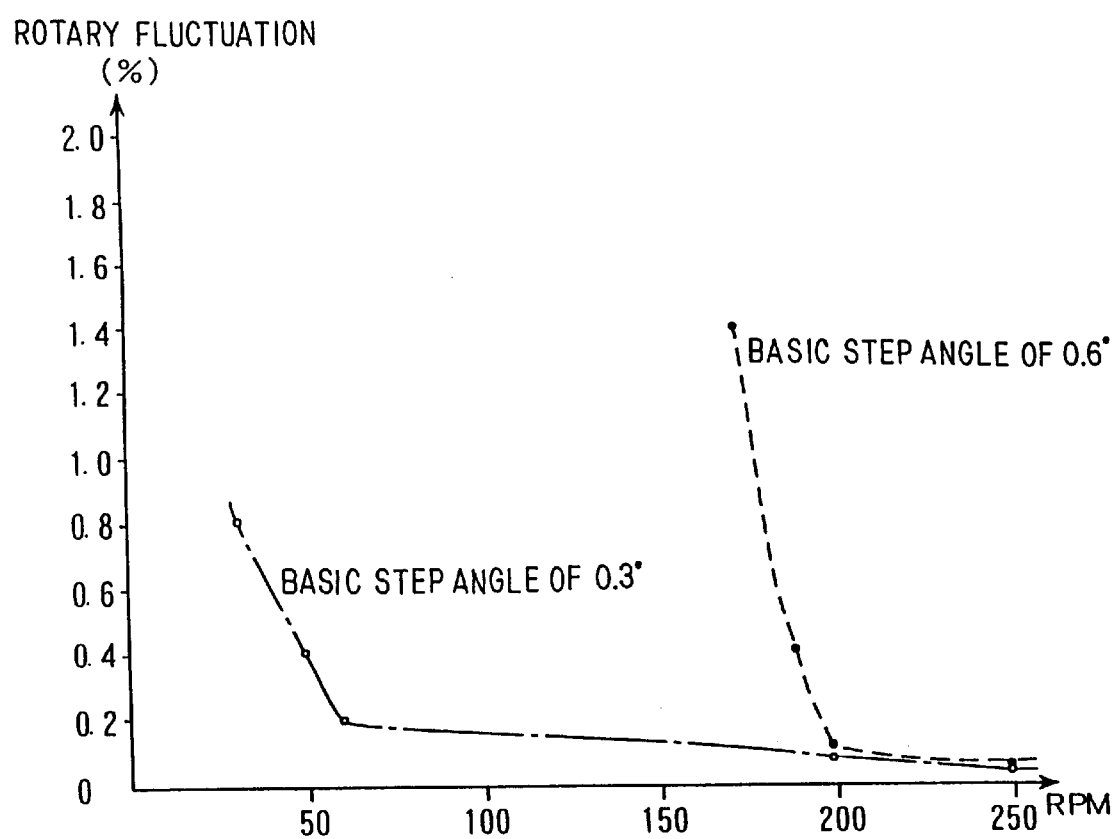
FIG. 5 is a diagram showing a property of a stepping motor of the present invention suitable for use in a direct drive system.
Figure 7:
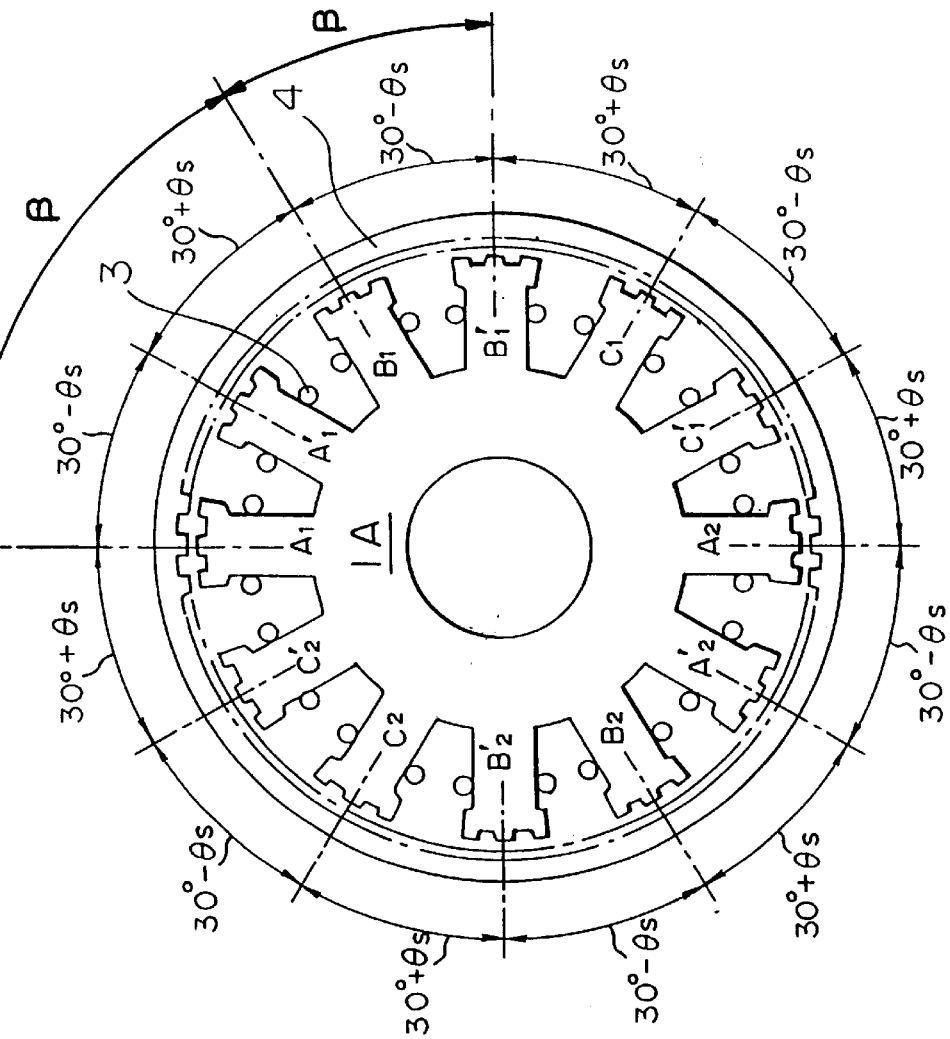
FIG. 7 is a view, taken along lines 7—7 of FIG. 6.

FIG. 7. shows a cross section taken along lines 7—7 of FIG. 6.

In FIGS. 6 and 7, symbols 1A and 1B denote a first and second magnetic stator elements of the same width in the axial direction and the same diameter and configuration. A composite stator 1 is formed of the stator elements 1A and 1B, and a thin permanent magnet 2 inserted between the stator elements 1A and 1B. Reference numeral 3 denotes a plurality of exciting windings for the stator elements 1A and 1B, and 4 denotes a magnetic rotor.

The rotor 4 consists of rotor portions 4A and 4B of the same width, arranged side by side in the axial direction of the rotor 4 at the outside of the stator elements 1A and 1B, respectively. Each of the rotor portions 4A and 4B has at an inner peripheral surface thereof a plurality of pole teeth equally spaced about the circumferential thereof as shown in FIG. 7. It is preferable that the pole teeth of the rotor portion 4A are deviated from the pole teeth of the rotor portion 4B in the circumferential direction by one half of pitch of the pole teeth.

In this embodiment, the motor is of an outer rotor type, so that the permanent magnet 2 is not arranged at the rotor 4, but is arranged at the stator 1. The permanent magnet 2 has a similar configuration to the stator elements 1A and 1B, and is magnetized in the axial direction. The stator elements 1A and 1B are excited by the common exciting winding 3 mounted on each magnetic pole of stator elements 1A and 1B.

The motor of this embodiment has twelve stator magnetic poles $A_1$, $A_2$, $B_1$, $B_2$, $C_1$, $C_2$, $A'_1$, $A'_2$, $B'_1$, $B'_2$ and $C'_1$, $C'_2$ as shown in FIG. 7 and the permanent magnet 2 is magnetized into two poles N and S in the axial direction thereof.

In FIG. 6, if the exciting winding 3 is energized by a direct exciting current under the state that the stator element 1B is S pole and the stator element 1A is N pole, the magnetization of one of the stator elements 1A and 1B is enhanced (the direction of magnetic flux of the permanent magnet 2 is the same with that of the exciting winding 3), but the magnetization of the other of the stator elements 1A and 1B is reduced (the direction of magnetic flux of the permanent magnet 2 is opposite to that of the exciting winding 3).

As a result, a flux from the N pole of the stator enhanced magnetically enters into the magnetic rotor 4 having a number of pole teeth at the inner peripheral surface thereof through an air gap, and then enters into the S pole of the stator enhanced magnetically, so that a magnetic path is formed to generate a torque.

In the motor shown in FIG. 7, two magnetic poles $A_1$ and $A_2$ among the twelve stator poles, for example, are symmetrical with respect to a point and angularly shifted by 180°, and connected by a winding forming one phase A, for example.

Windings of A, B and C phases form one set of three-phase windings and windings of A', B' and C' phases form other set of three-phase windings.

Specifically, the A phase is formed by the winding wound around the stator poles $A_1$ and $A_2$, the B phase is formed by the winding wound around the stator poles $B_1$ and $B_2$, and the C phase is formed by the winding wound around the stator poles $C_1$ and $C_2$.

The above windings of the A, B and C phases form one set of three-phase windings.

Similarly, the A' phase is formed by the winding wound around the stator poles $A'_1$ and $A'_2$, the B' phase is formed by the winding wound around the stator poles $B'_1$ and $B'_2$, and C' phase is formed by the winding wound around the stator poles $C'_1$ and $C'_2$. The above windings of the A', B' and C' phases form the other set of three-phase windings.

That is, one set of three-phase windings is formed by six every other magnetic poles among the twelve stator magnetic poles, and other set of three-phase windings is formed by remaining six magnetic poles among the twelve stator magnetic poles. The stepping motor of this embodiment has thus two sets of three-phase windings.

An angle formed between corresponding pole teeth of the adjacent magnetic poles $A_1$ and $A'_1$ is (30−θs) and an angle formed between corresponding pole teeth of the adjacent magnetic poles $A'_1$ and $B_1$ is (30°+θs). The magnetic poles are so arranged that the angles of (30°−θs) and (30°+θs) are repeated alternately, where θs is (30°/Nr)/k, where k is an integer number not less than 1.

Figure 8:
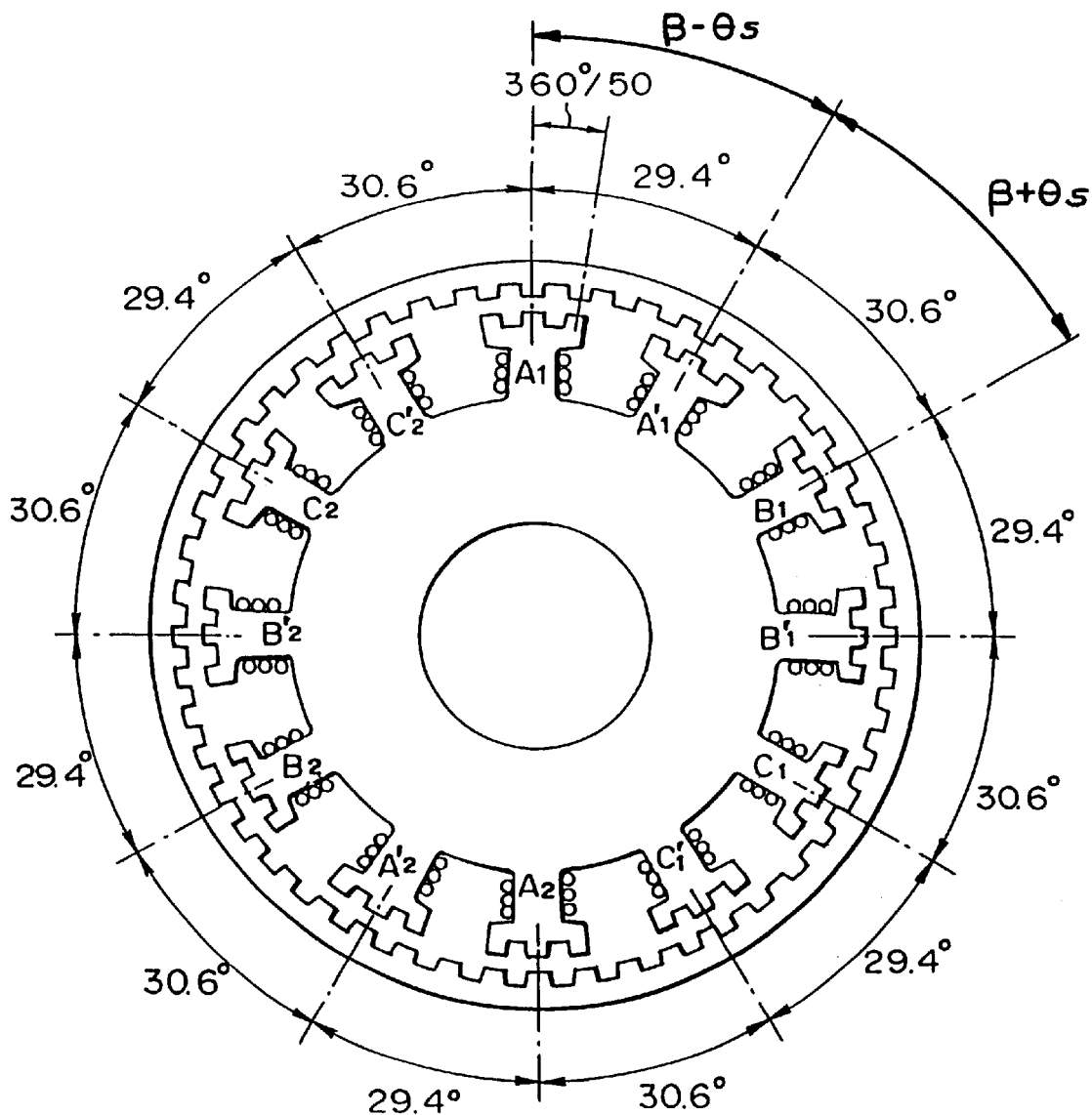
FIG. 8 is a side view of the stepping motor shown in FIG. 7 wherein the step angle θs is 0.6°.

FIG. 8. shows a modification of FIG. 7 wherein θs is 0.6°.

Figure 9:
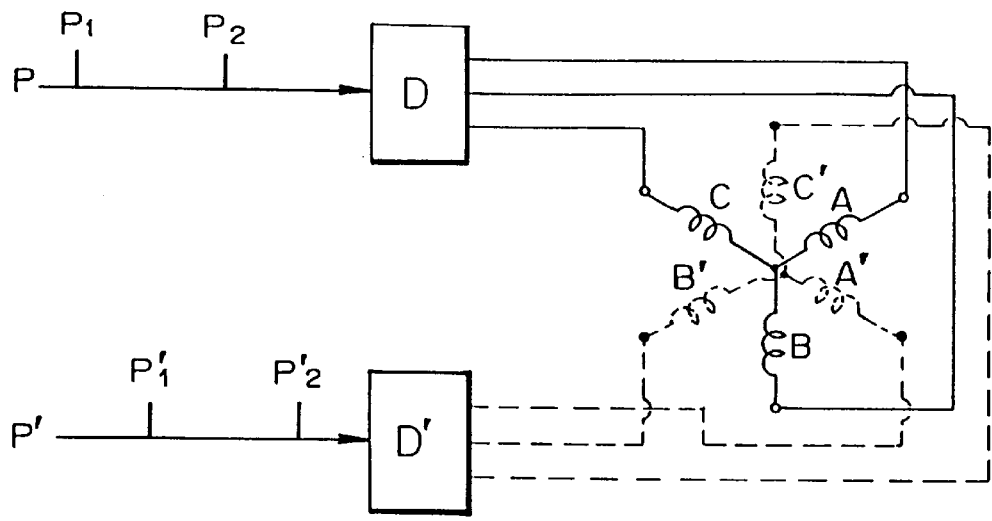
FIG. 9 is a driving circuit for the stepping motor of the first embodiment of the present invention.

The composite type three-phase stepping motor can be driven by three-phase driving circuits D and D' as shown in FIG. 9. The driving circuit D or D' can be formed as shown in FIG. 3 and the output voltage thereof can be shown as FIGS. 4A to 4D.

Trigger pulses for transistors $Tr_1 \sim Tr_6$ forming the driving circuit D are $P_1$ and $P_2$, and trigger pulses for transistors $Tr_1 \sim Tr_6$ forming the driving circuit D' are P', and $P'_2$. It is preferable that as shown in FIG. 9. the trigger pulse $P'_1$ is generated at a center in phase between the trigger pulses $P_1$ and $P_2$, and the trigger pulse $P'_2$ is generated at a center in phase between the trigger pulses $P_2$ and $P_3$ (not shown). It is possible to generate the trigger pulses $P'_1$ and $P'_2$ at positions other than the center.

The output voltages supplied from the driving circuit D to the windings of A, B and C phases are shown in FIG. 4B, FIG. 4C and FIG. 4D, whereas the output voltages supplied from the driving circuit D' are delayed by 30° in phase (the phase between $P_1$ and $P_2$ is 60°) from the output voltages supplied from the driving circuit D, respectively.

The composite type three-phase stepping motor shown in FIGS. 6 and 7 are driven by the driving circuits D and D' as shown in FIG. 9.

If the stepping motor shown in FIGS. 6 and 7 is driven as a three-phase motor by only one driving circuit D shown in FIG. 9 using one set of the three-phase windings A, B and C included in the stepping motor, the step angle thereof becomes 60'/Nr, because the three-phase motor is phase changed by 60° (between $P_1$ and $P_2$), where Nr is the number of rotor pole teeth.

If this stepping motor is driven by only one driving circuit D' shown in FIG. 9 using the other set of three-phase windings A', B' and C' included in the stepping motor, the step angle thereof also becomes 60°/Nr.

Accordingly, if this stepping motor is driven by the two driving circuits D and D' shown in FIG. 9, this stepping motor can be rotated with the step angle of 30°/Nr Specifically, the three-phase magnetic poles corresponding to the one set of windings of A, B and C phases are deviated by θs in position from that corresponding to the other set of windings of A',B' and C' phases.

The θs becomes a step angle when the phase is changed from A phase to A' phase, so that if θs is set to 30°/Nr, the step angle becomes one half of the step angle of 60°/Nr in case that only one set of three-phase windings is used.

By repeating the phase change from A, B and C phases to A',B' and C' phases alternately, the stepping motor is rotated with the step angle of 30/Nr.

A Second Embodiment:

In the stepping motor of the first embodiment shown in FIG. 7, the twelve magnetic poles are arranged in the order of $A_1$, $A'_1$, $B_1$, $B'_1$, $C_1$, $C'_1$, $A_2$, $A'_2$, $B_2$, $B'_2$, and $C_2$, $C'_2$. In the second embodiment, however, as shown in FIG. 10, the twelve magnetic poles are arranged in the order of $A_1$, $B_1$, $C_1$, $A'_1$, $B'_1$, $C'_1$, $A_2$, $B_2$, $C_2$, $A'_2$, $B'_2$ and $C'_2$ with a pitch of 360°/12 except that the magnetic poles $A'_1$ and $A'_2$ are deviated from the magnetic poles $C_1$ and $C_2$ by (30°−θs), respectively, and the magnetic poles $A_2$ and $A_1$ are deviated from the magnetic pole $C'_1$ and $C'_2$ by (30°+θs), respectively.

The magnetic poles deviated by 180° are symmetrical with each other.

Figure 10:
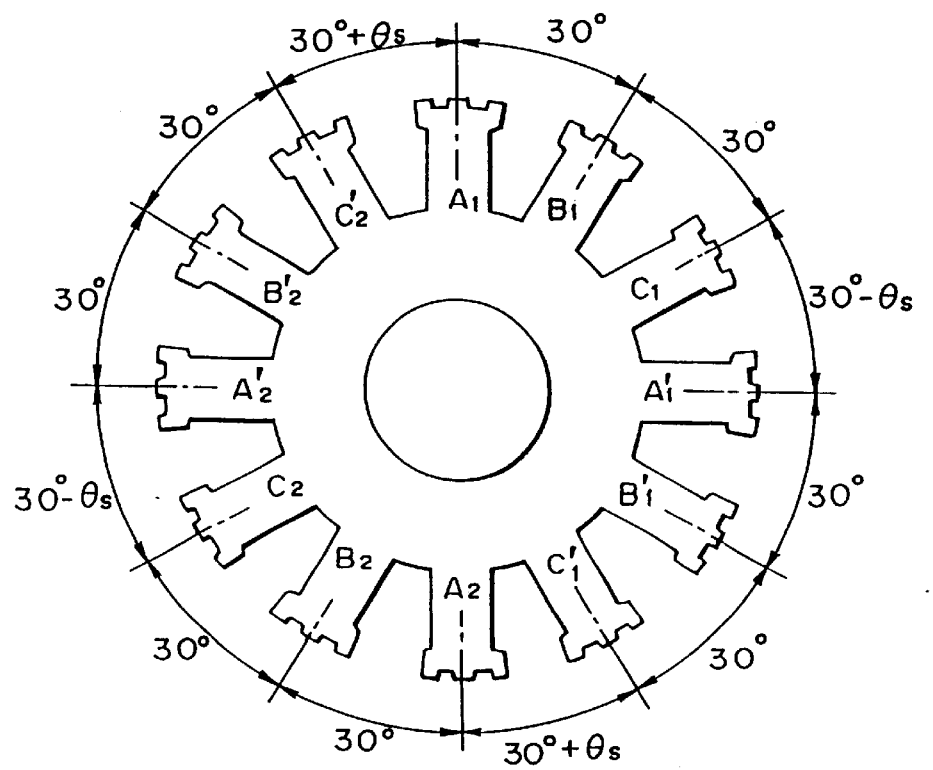
FIG. 10 is a side view of a stator in an outer rotor composite type three-phase stepping motor having twelve magnetic poles of a second embodiment of the present invention.

The vertical section of the stator in the stepping motor shown in FIG. 10 is the same with that shown in FIG. 6. The stepping motor shown in FIG. 10 is operated with a step angle of 30/Nr by the driving circuits as shown in FIG. 9.

In another embodiment, six stator magnetic poles $A_1$, $B_1$, $C_1$, $A_2$, $B_2$ and $C_2$ among the twelve magnetic poles are arranged in this order to form a first group of three-phase magnetic poles and the other six stator magnetic poles $A'_1$, $B'_1$, $C'_1$, $A'_2$, $B'_2$ and $C'_2$ are arranged in this order to form a second group, the second group being deviated by θs from the first group.

In this embodiment, the vertical section of the stepping motor is the same with that shown in FIG. 6.

The number of the stator magnetic poles is not limited to 12 and can be set to 6 n, where n is an integer and n≧1. In this case, two sets of three-phase magnetic poles are formed by 6 n, and a mechanical device angle formed between adjacent stator poles in each set is set to 60° m/n, and a mechanical degree angle formed between two sets of three-phase magnetic poles is set to (60 m/n)−θs, where m is an integer and θs is (30°/Nr)/k, where k is an integer number not less than 1. In the case shown in FIG. 10, m is 1 and n is 2, so that 6 n is 12. A mechanical angle formed between the adjacent magnetic poles is 60° m/n, that is 30°. Each of the angles formed between the magnetic poles $C_1$ and $A'_1$, and $C_2$ and $A'_2$ are (60° m/n)−θs, that is 30°−θs. Each of the angles formed between the magnetic poles $C'_1$ and $A_2$, and $C'_2$ and $A_1$ is (60° m/n)+θs, that is 30°+θs.

Figure 11:
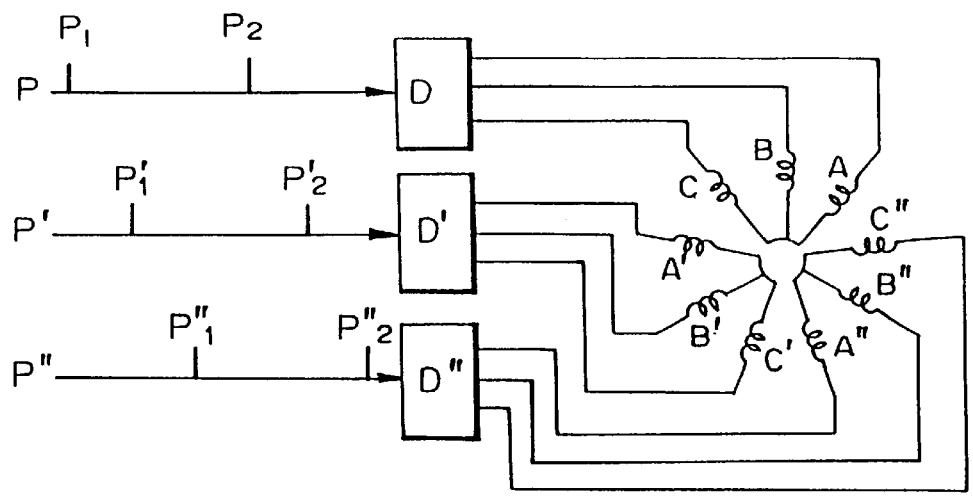
FIG. 11 is a driving circuit for a composite type three-phase stepping motor having eighteen magnetic poles of the present invention.

The stepping motor shown in FIG. 10 has two sets of three-phase windings(not shown). It is possible to form a composite type three-phase stepping motor having eighteen magnetic poles and three sets of three-phase windings as shown in FIG. 11. The three sets of three-phase windings shown in FIG. 11 are star connected, however, a delta connection may be adopted.

In this case, the stepping motor is rotated by triggering three driving circuits D, D' and D" similar in construction to one another in order, as like as that shown in FIG. 9.

Each of the driving circuits D, D' and D" is the same with that shown in FIG. 3 and the outputs thereof can be expressed as shown in FIGS. 4A to 4D. In general, k sets of a driving circuit each consisting of six transistors $Tr_1$ to $Tr_6$ as shown in FIG. 3 are used and triggered in order, a first set of three-phase circuit being triggered again in (k+1)th order, so that the composite type three-phase stepping motor having k sets of three-phase windings arranged in the circumferential direction of the stepping motor can be driven. In this case, the step angle is 60°/(k·Nr), which is 1/k times of the step angle of the three-phase type.

The driving method using the three-phase driving circuit shown in FIG. 9 or FIG. 11 as a module can be applied not only to the outer rotor composite type three-phase stepping motor, but also to the inner rotor composite type three-phase stepping motor.

According to the embodiments of the present invention, following effects can be obtained.

(1) In the outer rotor composite type three-phase stepping motor,the magnet area and the torque can be increased, and the number of rotor pole teeth Nr and the phase number P can be increased economically.

Accordingly, the step angle expressed by the formula 180°/(Nr·P) can be reduced, so that no fluctuation in rotation is generated even at the low speed such as about 30 to 60 rpm and a motor of larger torque can be realized.

If such motor is used to drive the transfer drum of the reproducing machine, a print of higher quality having no color doubling can be obtained.

(2) If k sets (where k is not less than 2) of conventional standard inexpensive three-phase circuit are used as a module for the driving circuit of the composite type three-phase stepping motor, an inexpensive multiphase driving circuit can be realized and the step angle thereof can be reduced to 1/k times of the step angle of the three-phase type.

A third and fourth embodiments of an inner rotor hybrid type double three-phase stepping motor of the present invention will now be explained.

Figure 12:
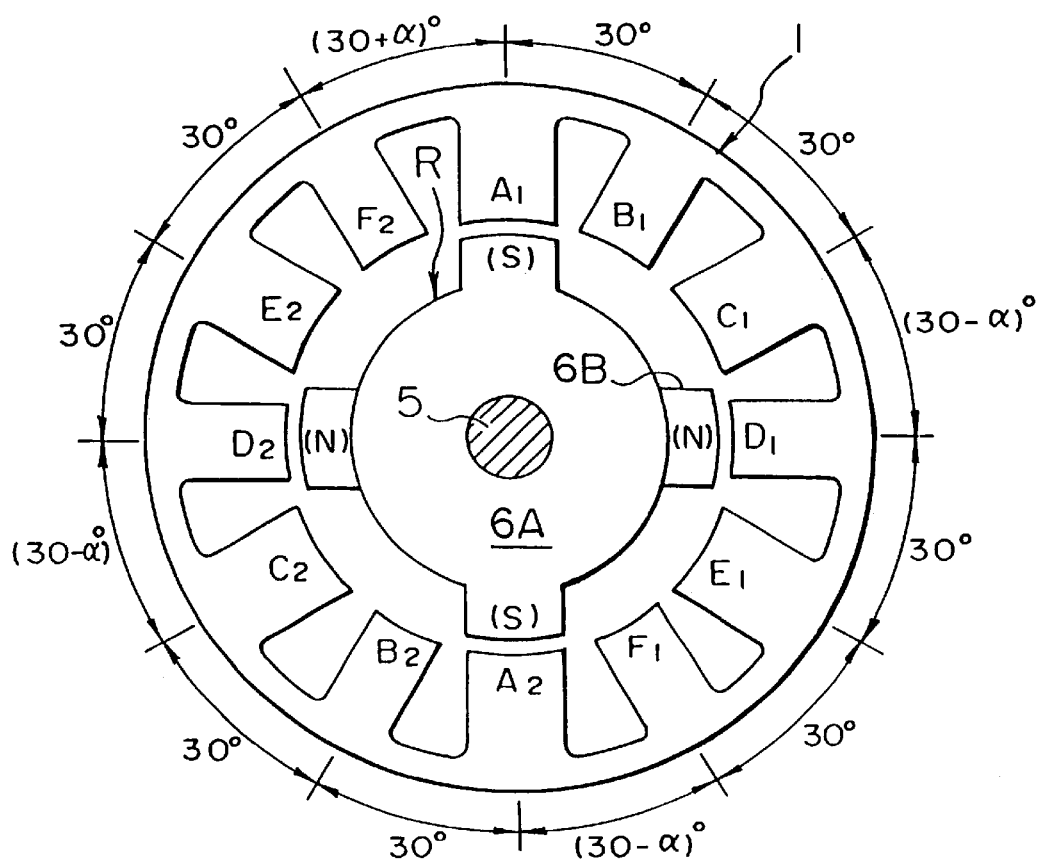
FIG. 12 is a side view of a double three-phase hybrid type stepping motor of a third embodiment of the present invention.
Figure 13:
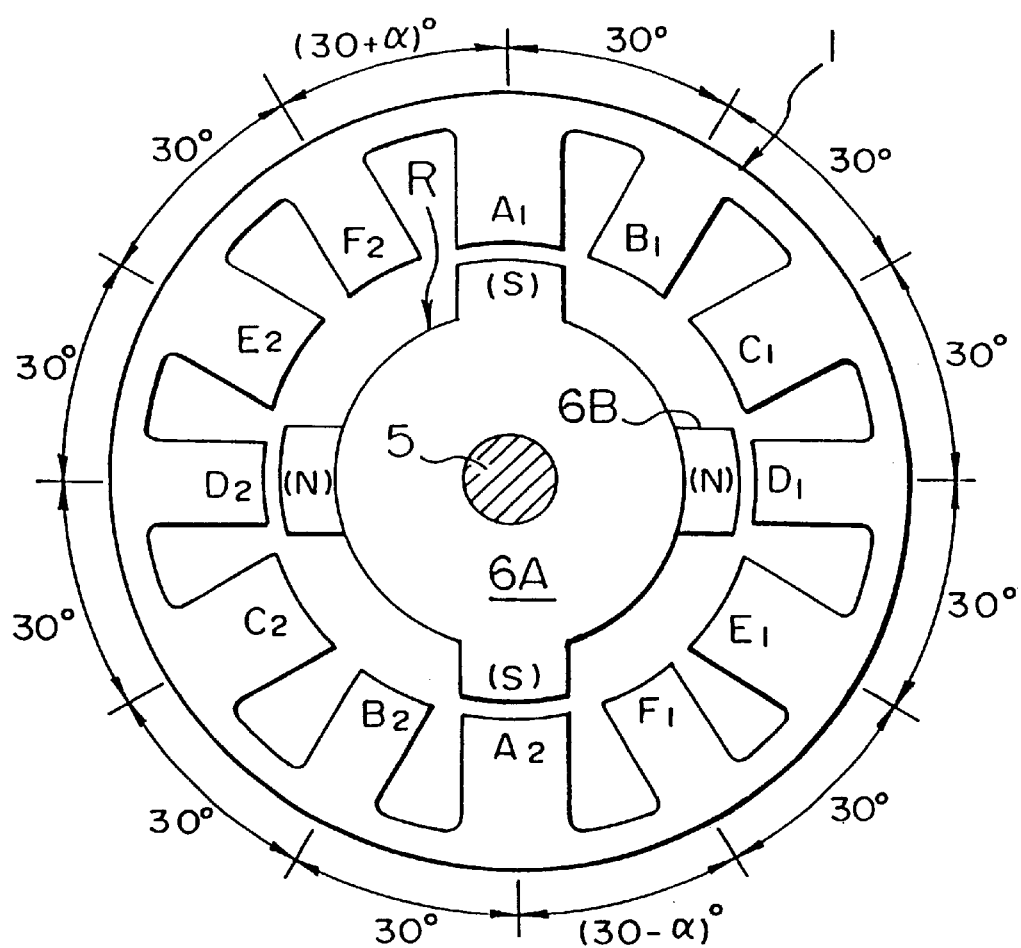
FIG. 13 is a side view of a stepping motor of a fourth embodiment of the present invention.
Figure 14:
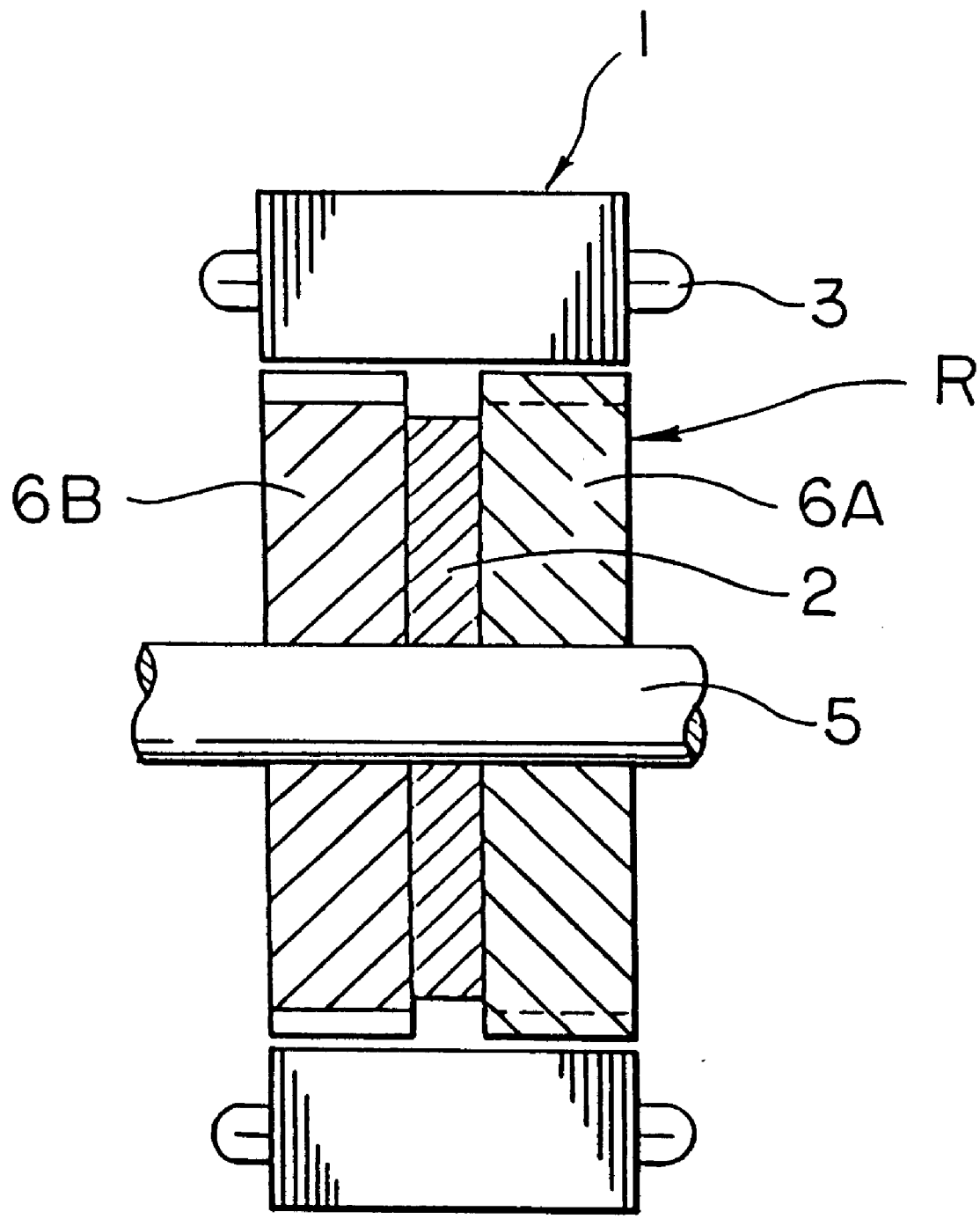
FIG. 14 is a vertically sectional front view of the stepping motor of the third or fourth embodiment of the present invention.

FIG. 12 shows a side view of the third embodiment of the stepping motor having 6 m pieces of main magnetic pole, where m is 2, the number of pole teeth of the stator main pole Ns is 1 and the number of pole teeth of the rotor Nr is 2. FIG. 13 shows a side view of the fourth embodiment of the stepping motor having 12 m pieces of main magnetic pole, where m is 1, Ns is 1 and Nr is 2. FIG. 14 is a vertically sectional front view of the stepping motor of the third or fourth embodiment.

The Third Embodiment:

In FIGS. 12 and 14, a symbol R is a magnetic rotor consisting of rotor elements 6A and 6B, a reference numeral 5 is a rotor shaft and 2 is a permanent magnet inserted between the rotor elements 6A and 6B.

As shown in FIG. 12, the stator 1 has first to twelfth stator main magnetic poles $A_1$, $B_1$, $C_1$, $D_1$, $E_1$, $F_1$, $A_2$, $B_2$, $C_2$, $D_2$, $E_2$ and $F_2$ arranged in this order. It is preferable that a plurality of pole teeth (not shown) are formed on each tip end of the main poles in order to set a small step angle thereof.

As shown in FIG. 14, the rotor R consists of the rotor elements 6A and 6B holding the permanent magnet 2 therebetween. Pole teeth are formed on the outer peripheral surfaces of the rotor elements GA and 6B which are magnetized in the axial direction of the rotor shaft 5. As shown in FIG. 12, the rotor element GA is magnetized to S pole and the rotor element GB is magnetized to N pole The corresponding stator main magnetic poles $A_1$ and $A_2$, $D_1$ and $D_2$, - - - $F_1$ and $F_2$ among the twelve main magnetic poles are symmetrical to each other with respect to a point, respectively. It is preferable that phase windings are wound around the symmetrical two main magnetic poles so as to form the same polarity with each other. The main magnetic poles $A_1$, $B_1$, $C_1$, - - - $D_2$, $E_2$ and $F_2$ are arranged with a pitch angle of 30° except that each pitch angle between the third and fourth, and ninth and tenth main magnetic poles $C_1$ and $D_1$, and $C_2$ and $D_2$ is set to $(30-\alpha)°$ and that each pitch angle between sixth and seventh, and twelfth and first main magnetic poles $F_1$, and $A_2$, and $F_2$ and $A_1$ is set to $(30+\alpha)°$.

If Nr is set to 50, α is 30°/Nr, that is 0.6°, so that the step angle of the stepping motor is 180°/(6×50), that is 0.6°.

If Nr is 100, α is 0.3°, so that the step angle of the stepping motor is 180/(6×100), that is 0.3°.

It is preferable that the slot width formed on each of the twelve main magnetic poles is made large for winding the stator windings 3 around the main magnetic poles and that the number of the pole teeth formed on each of the twelve main magnetic poles is made large in order to generate a large torque.

As stated above, in case that the group of the main magnetic poles D, E and F is deviated by α° from the group of the main magnetic poles A, B and C, if the angle α is small, the variation in slot width becomes small, the winding of windings becomes easy.

If the inner diameter of stator is 35 mm, Nr is 50 and the step angle is 0.6°, for example, α becomes 0.6°. In this case, the outer peripheral length corresponding to 0.6° is about 0.18 mm, so that even if four pole teeth are formed on the tip end of each of the twelve main magnetic poles, the stator windings can easily be wound around the main magnetic poles.

In case that Nr is 50, α is 90/Nr, that is 1.8°, and the step angle is 0.6°. In order to obtain a sufficient slot width for winding the windings, the number of pole teeth formed on the tip end of each of the twelve main magnetic poles must be limited to not more than three, so that the torque becomes small, however, there is no trouble in practice.

As stated above, in the stepping motor shown in FIG. 12 or FIG. 13, the windings for each phase are wound to make the same polarity around two corresponding main magnetic poles symmetrical to each other with respect to a point among the twelve main magnetic poles, so that forces in the radial direction applied to the pole teeth of the rotor by the two main magnetic poles are canceled each other and that the oscillation of the stepping motor can be reduced.

A concrete connection system of stator windings to be wound around the twelve main magnetic poles $A_1$ to $F_2$ of the third embodiment will now be explained with reference to FIG. 15.

Figure 15:
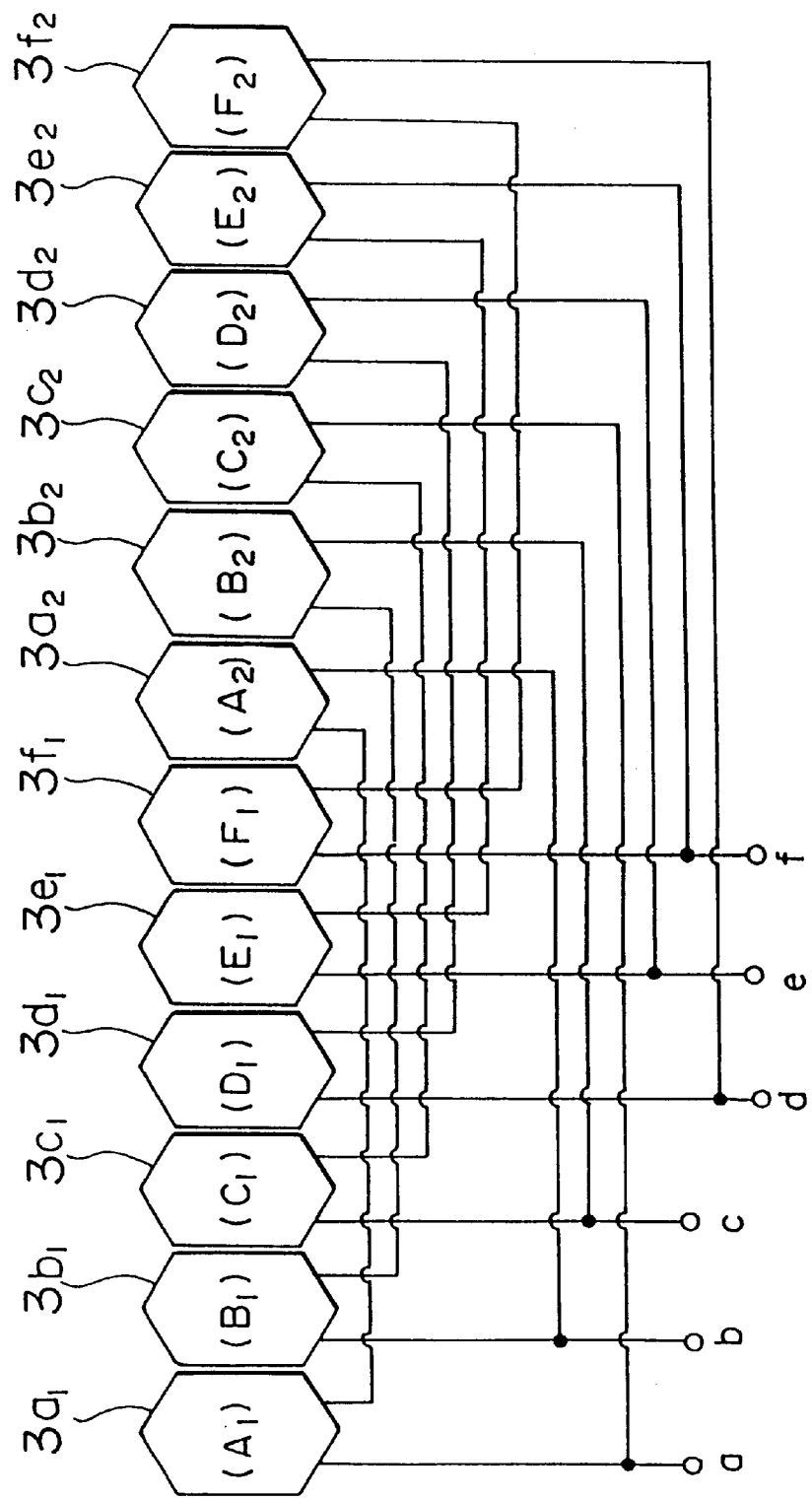
FIG. 15 is a circuit diagram of the stator windings of the third embodiment of the present invention.

In FIG. 15, reference numerals $3a1$, $3b1$, $3c1$, $3a2$, $3b2$, $3c2$, and $3d1$, $3e1$, $3f1$, $3d2$, $3e2$, $3f2$ are stator windings to be wound around the main magnetic poles $A_1$, $B_1$, $C_1$, $A_2$, $B_2$, $C_2$, and $D_1$, $E_1$, $F_1$, $D_2$, $E_2$, $F_2$ shown in FIG. 12, respectively. These windings are connected at winding ends thereof to form a double-delta connection as shown in FIG. 15.

In case that the winding ends of the windings $3a1$ and $3a2$, $3b1$ and $3b2$ and $3c1$, and $3c2$ are connected to each other to form a so-called star connection system, the stepping motor can be driven by a driving circuit using twelve transistors.

The Fourth Embodiment:

FIG. 13 shows the fourth embodiment of the present invention. In this embodiment, as shown in FIG. 13, first to twelfth main magnetic poles $A_1$, $B_1$, $C_1$, $D_1$, E, F, $A_2$, $B_2$, $C_2$, $D_2$, $E_2$ and $F_2$ are arranged in this order with a pitch angle of 30° except that an angle between the sixth main magnetic pole $F_1$ and the seventh main magnetic pole $A_2$ is set to $(30-\alpha)°$ and that an angle between the twelfth main magnetic pole $F_2$ and the first main magnetic pole $A_1$ is set to $(30+\alpha)°$.

In this embodiment, the twelve main magnetic poles are not symmetrical with respect to a point, so that the oscillation becomes somewhat larger than that in the third embodiment shown in FIG. 12. However, the same effect in reduced step angle as in the third embodiment can be obtained.

The stator windings are excited by the bipolar system wherein the direction of a current flowing through the stator windings is changed to positive and negative alternately, so that the space factor and efficiency of the stator windings become larger than that by the unipolar system.

In case that the stator windings in each phase are connected at the winding ends thereof to form a star connection, the driving circuits can be formed of twelve switching transistors even in the bipolar six-phase system, and the number of the switching transistors for use in the conventional six-phase system wherein twenty-four switching transistors are required can be reduced to one half.

Figure 16:
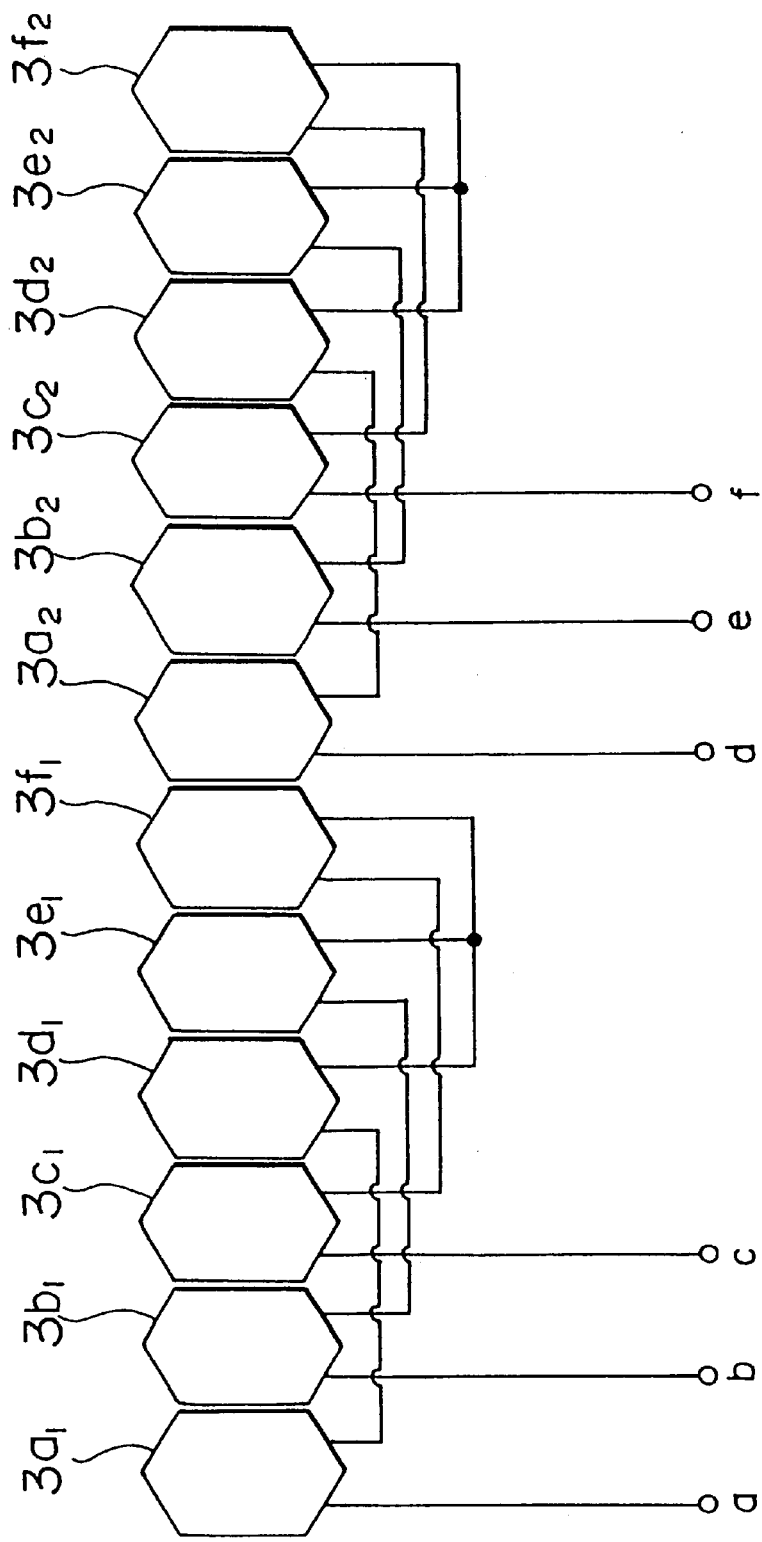
FIG. 16 is a circuit diagram of the stator windings of the fourth embodiment of the present invention.

FIG. 16 shows a concrete star connection of the windings in the fourth embodiment of the present invention which can be driven by twelve switching transistors as like as that in the third embodiment shown in FIG. 15.

Input terminals a, b, c, d, e and f of the windings are connected to the driving circuit. One of two switching transistors of bridge connection used in the driving circuit is connected to the (+) terminal of the power source, and the other is connected to the (−) terminal of the power source.

An alternating current can be passed through each phase by conducting either one of the two switching transistors to form a so-called bipolar system, so that a higher torque can be obtained.

Normally, in case of six independent phases of bipolar type, twenty-four switching transistors are required, whereas in the driving system of the present invention, only twelve switching transistors are required.

Figure 17:
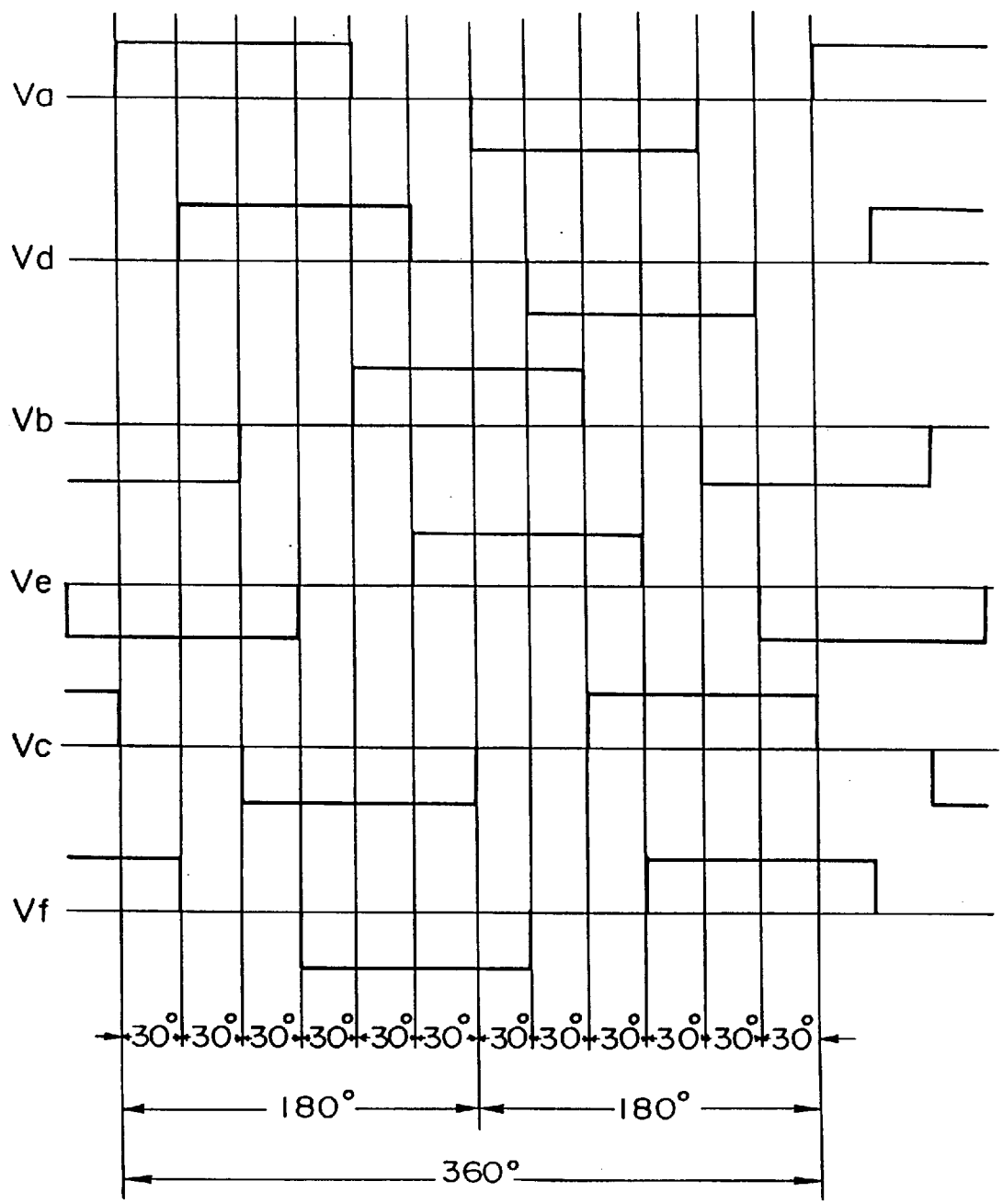
FIG. 17 is a circuit diagram of exciting voltages applied on the input terminals of stator windings of the present invention.

FIG. 17 shows exciting voltages applied on the stator windings of each stepping motor of the third and fourth embodiments stated above. In FIG. 17, $V_a$ to $V_f$ are waveforms of the exciting voltages applied on the input terminals a to f shown in FIG. 15 or FIG. 16. The voltages $V_a$ to $V_f$ are applied to the terminals a to f, respectively.

As shown in FIG. 17, the exciting voltages $V_a$, $V_b$ and $V_c$ applied on the terminals a, b and c, and the exciting voltages $V_d$ to $V_e$ and $V_f$ applied on the terminals d, e and f are deviated by 60° in phase from one another. Accordingly, it is preferable that the voltage applied on a group of the input terminals a, b and c is deviated in phase by δ from the voltage applied on a group of the input terminals d, e and f, and that the δ is set to 30°. However, stepping motor can be operated under the state of 0°≦δ<30°, and operated as a three-phase stepping motor, if δ is 0°.

The stepping motor of the third embodiment of the present invention can be operated as a three-phase stepping motor when the voltages $V_a$, $V_b$ and $V_c$ shown in FIG. 17 are applied to the windings of A, B and C phases. The resolution of the double three-phase stepping motor of the present invention is increased twice the resolution of the three-phase stepping motor, because the windings of D phase is excited by $V_d$ between the excitations of the windings of A and B phases, the windings of E phase is excited by $V_e$ between the excitations of the windings of B and C phases, and the windings of F phase is excited by $V_f$ between the windings of C and A phases, and the rotor can also be stopped at the D, E and F phases, respectively, so that the rotor can be stopped at the D, E and F phases, respectively.

As stated above, it is suitable to use a composite three-phase hybrid type stepping motor in order to provide a stepping motor low in cost, small in rotary fluctuation and ΔT. For example, in order to reduced the ΔT, a six-phase hybrid type stepping motor may be used, however, twenty-four switching transistors are required for the driving circuit. On the contrary, in the double three-phase type as in the present invention, only twelve switching transistors are required.

Figure 18:
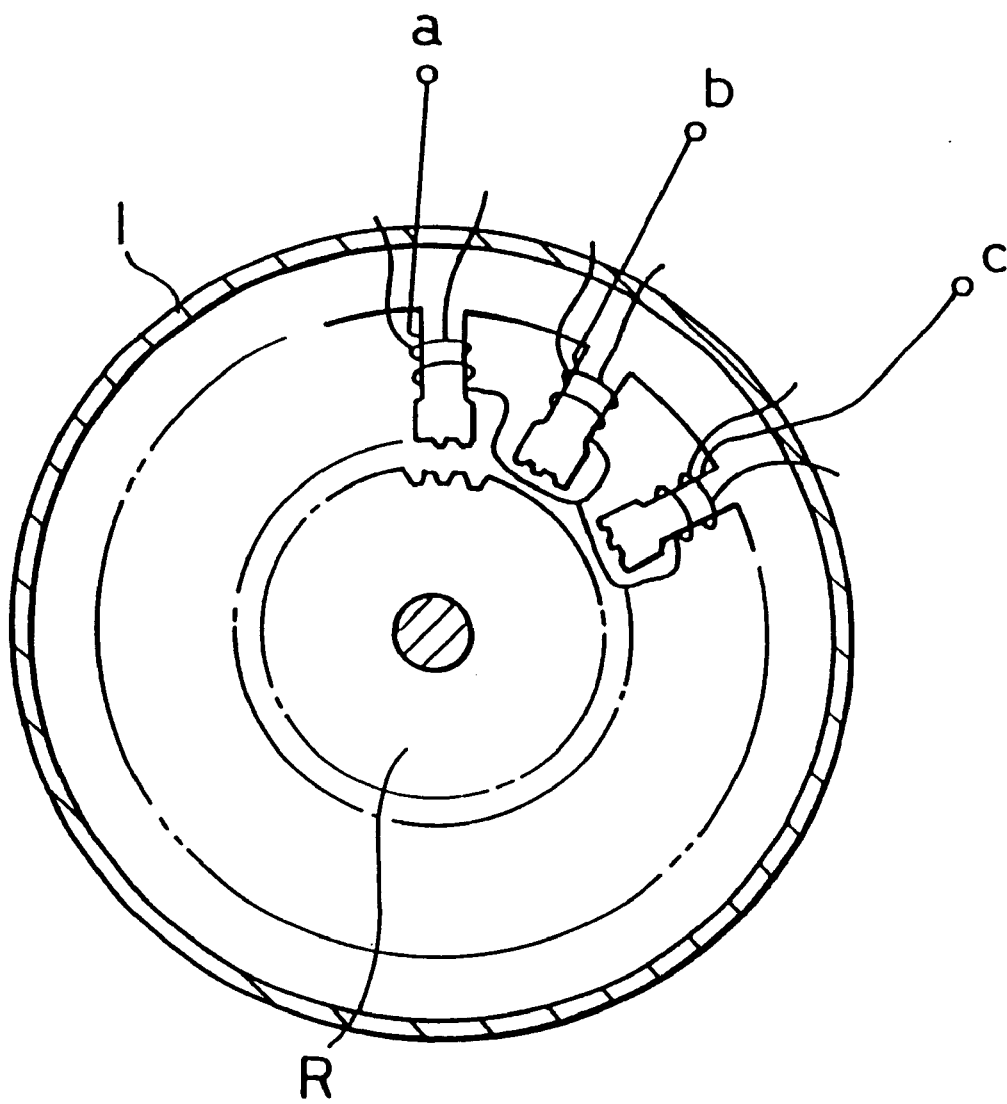
FIG. 18 is a cross section of the composite type stepping motor suitable for use in the direct driving system of the present invention.

FIG. 18 is a cross section of the composite type three-phase stepping motor, and shows only one set of three-phase windings. The composite type stepping motor of double three-phase type can easily be formed by two sets of three-phase windings. The composite type stepping motor of triple three-phase type can easily be formed by three sets of three-phase windings. The rotor of the stepping motor in this embodiment is similar to that of the conventional hybrid type stepping motor wherein a permanent magnet magnetized in the axial direction is held by two rotor elements each having pole teeth in the outer periphery thereof.

An inner rotor hybrid type stepping motor having double three-phase windings which meets with the above requirement is similar to that shown in FIGS. 12 and 14.

Figure 19:
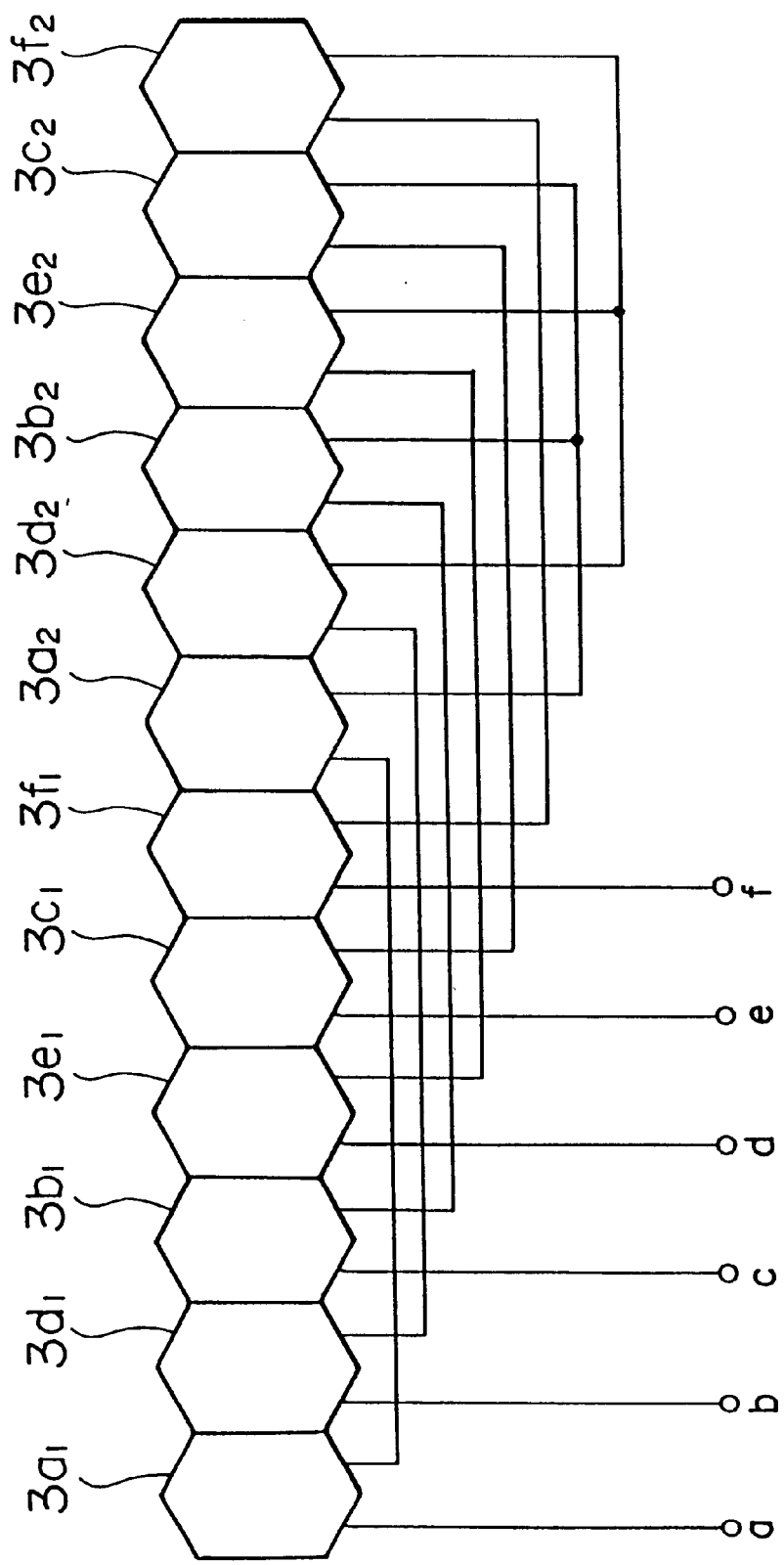
FIG. 19 is a circuit diagram of the stator windings of the stepping motor having twelve main magnetic poles shown in FIG. 12.

FIG. 19 shows another connection system of the stator windings 3 wound around the twelve stator main magnetic poles $A_1$ to $F_1$ and $A_2$ to $F_2$ shown in FIGS. 12 and 14.

In FIG. 19, reference numerals 3a1, 3b1, 3c1, 3a2, 3b2, 3c2 and 3d1, 3e1, 3f1, 3d2, 3e2, 3f2 show stator windings wound around the main magnetic poles $A_1$, $B_1$, $C_1$, $A_2$, $B_2$, $C_2$ and $D_1$, $E_1$, $F_1$, $D_2$, $E_2$, $F_2$, respectively. These windings are connected one another at winding ends thereof to form a double-star connection.

Figure 20:
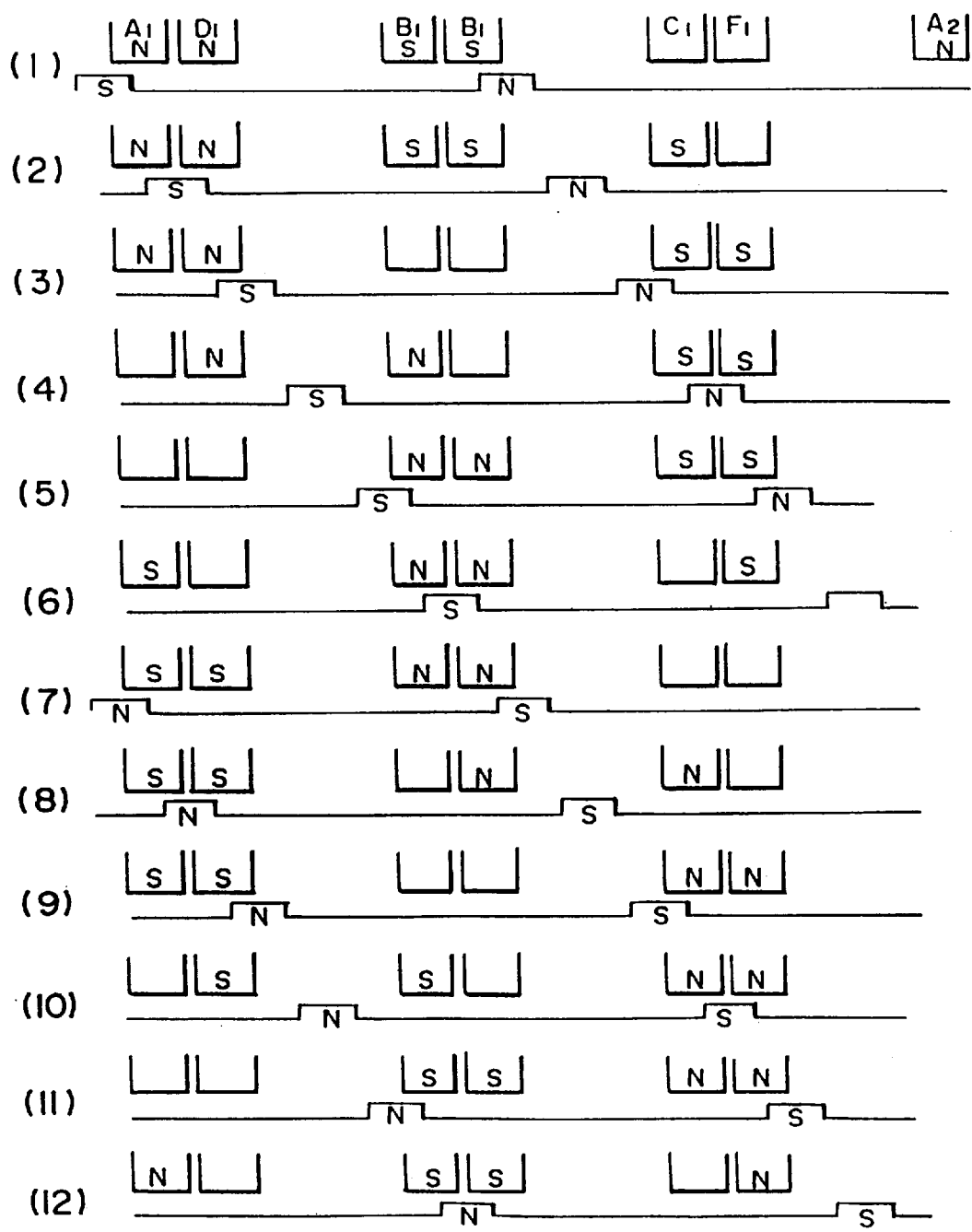
FIG. 20 is an expanded view showing the relative positions between the pole teeth of the stator main magnetic poles and the rotor.

FIG. 20 shown the relative positions between the pole teeth of the stator main magnetic poles and the rotor in case that the stepping motor of the present invention is driven by applying the exciting voltages shown in FIG. 17 on the input terminals of the stepping motor.

Further, in FIG. 20, only six main magnetic poles $A_1$, $D_1$, $B_1$, $E_1$, $C_1$, and $F_1$ corresponding to one half of the twelve main magnetic poles shown in FIG. 12 are shown in order to simplify the explanation. As shown in FIG. 20, it is apparent that through the steps 1 to 12 the rotor rotates by 360°/Nr, that is, a pitch angle of rotor, and one step angle becomes (360/N)°×(1/12).

The present invention is not limited to the above embodiments.

Specifically, the double three-phase winding type of stepping motor having the permanent magnet of the first embodiment of the present invention shown in FIGS. 12 and 14 can be operated as a three-phase motor by exciting only windings wound around the stator main magnetic poles $A_1$, $B_1$, $C_1$, $A_2$, $B_2$ and $C_2$ or $D_1$, $E_1$, $F_1$, $D_2$, $E_2$ and $F_2$. In such a case, as stated above, the step angle becomes twice the step angle of the six-phase motor.

It is possible to connect in series or parallel the windings of A, B and C phases with the windings of D, E and F phases, instead of the connection system shown in FIG. 15.

The stepping motor stated above has the stator and the rotor of hybrid type shown in FIGS. 12, 13 and 14. However, the present invention is not limited thereto. The above operation of the motor can be obtained by using a cylindrical permanent magnet (not shown) having on the outer peripheral surface thereof the same number of N and S poles as the number Nr of the pole teeth of the hybrid rotor instead of the hybrid type rotor. In such a case, it is possible to cancel each other the attracting forces in the radial direction applied on the rotor and the point symmetrical two main magnetic poles (deviated by 180° from each other) if the number Nr is an odd number, because the point symmetrical two main magnetic poles are magnetized in opposite polarities.

In case that the cylindrical permanent magnet is used, the oscillation becomes smaller than that in the hybrid type, because the surface magnetic flux thereof is distributed as a sine wave.

The permanent magnet type stepping motor of the present invention has following effects.

(1) A stepping motor of higher speed and larger torque can be obtained when the present invention is applied to the six-phase (double three-phase) motor as in the third embodiment, because the same step angle as the step angle in the conventional three-phase motor can be obtained by the rotor pole teeth of one half of the pole teeth of the conventional three-phase motor.

(2) In the bipolar type stepping motor of the present invention, a large torque can be obtained, and the number of switching transistors can be reduced to 12 which is one half of that in the conventional stepping motor, and therefore the driving circuit can be formed at low cost.

(3) The freedom can be increased in case that the stepping motor is driven as a three-phase motor, because the stepping motor can be driven with a drive angle twice that in the stepping motor driven as a six-phase (double three-phase) motor.

(4) The oscillation can be reduced if the rotor is formed of a cylindrical permanent magnet.

(5) The step angle of the stepping motor having pole teeth on each tip end of the main stator magnetic poles can be reduced compared with the stepping motor having no pole tooth.

It should be understood that embodiments of the present invention not disclosed herein are fully intended to be within the scope of the claims.

What is claimed is:

1. A method of driving a stepping motor comprising a stator having 6 m pieces of stator main magnetic pole extending radially with Ns pieces of pole tooth formed on a tip end of each stator main magnetic pole piece, and windings wound around the stator main magnetic pole pieces, and a hybrid type rotor consisting of two magnetic rotor elements arranged so as to face a periphery of the stator through an air gap, Nr pieces of pole tooth being formed on a periphery of each of the rotor elements, wherein phase windings are wound around adjacent three stator main magnetic pole pieces and are connected to form a star connection or a delta connection, the method comprising:

exciting the phase windings in order by voltages, a phase of the voltage applied on the winding wound around (n)th main magnetic pole piece being deviated by 30° from a phase of the voltage applied on the winding wound around (n+3)th main magnetic pole piece among the 6 m pieces of the main magnetic poles, where m is an integer and is $\geq 1$, Ns is an integer and is $\geq 1$, and Nr is an integer and is $\geq 2$.

2. A method of driving a stepping motor comprising a stator having 12 m pieces of stator main magnetic pole extending radially with Ns pieces of pole tooth formed on a tip end of each stator main magnetic pole piece, and windings wound around the stator main magnetic pole pieces, and a permanent magnet rotor arranged so as to face a periphery of the stator through an air gap, Nr sets of N and S poles formed alternately on a periphery thereof, phase windings wound around adjacent three stator main magnetic poles and are connected to form a star connection, or a delta connection the method comprising:

exciting the phase windings in order by voltages, a phase of the voltage applied on the winding wound around (n)th main magnetic pole piece being deviated by 30° from a phase of the voltage applied on the winding wound around (n+3)th main magnetic pole piece among the 6 m pieces of the main magnetic poles, where m is an integer and is $\geq 1$, Ns is an integer and is $\geq 1$, and Nr is an integer and is $\geq 2$.

3. The method as claimed in claim 1, wherein windings wound around the 12 m pieces of main magnetic pole are excited in order by voltages, a phase difference between voltages applied on the windings wound around (n)th and (n+6)th main magnetic pole pieces being 30°.

4. The method as claimed in claim 1, wherein windings wound around the 6 m pieces of main magnetic pole are excited in order by voltages, a phase difference between voltages applied on the windings wound around (n)th and (n+3)th main magnetic pole pieces being $\delta$, where $0° \leq \delta < 30°$.

5. The method as claimed in claim 1, wherein windings wound around the 12 m pieces of main magnetic pole are excited in order by voltages, a phase difference between voltages applied on the windings wound around (n)th and (n+6)th main magnetic pole pieces being $\delta$, where $0° \leq \delta < 30°$.

6. A method of driving a composite type three-phase stepping motor comprising phase windings wound around adjacent stator main magnetic pole pieces that are connected to form a star connection, the stator main magnetic pole pieces being non-symmetrical, the method comprising:

driving a first driving circuit having six transistors connected to one another to form a bridge that is configured to drive the composite type three-phase stepping motor; and alternately driving a second driving circuit having six transistors connected to one another to form a bridge that is configured to drive the composite type three-phase stepping motor.

7. A method of driving a composite type three-phase stepping motor comprising k sets of three-phase windings wound around stator main magnetic pole pieces arranged in the circumferential direction of the stepping motor that are connected to form a star connection, the stator main magnetic pole pieces being non-symmetrical, the method comprising:

triggering k sets of a driving circuit in order, each of the k sets has six transistors connected to form a bridge; and then triggering a first set of three-phase circuits again in a (k+1)th order, where k is an integer and $\geq 3$.

8. A method of driving a composite type three-phase stepping motor comprising phase windings wound around adjacent stator main magnetic pole pieces that are connected to form a delta connection, the stator main magnetic pole pieces being nonsymmetrical, the method comprising:

driving a first driving circuit having six transistors connected to one another to form a bridge that is configured to drive the composite type three-phase stepping motor; and alternately driving a second driving circuit having six transistors connected to one another to form a bridge that is configured to drive the composite type three-phase stepping motor.

9. A method of driving a composite type three-phase stepping motor comprising k sets of three-phase windings wound around stator main magnetic pole pieces arranged in the circumferential direction of the stepping motor that are connected to form a delta connection, the stator main magnetic pole pieces being non-symmetrical, the method comprising:

triggering k sets of a driving circuit in order, each of the k sets has six transistors connected to form a bridge; and then triggering a first set of three-phase circuits again in a (k+1)th order, where k is an integer and $\geq 3$.

* * * * *